C. V. BEAN.
INTERNAL COMBUSTION ENGINE.
APPLICATION FILED MAY 24, 1919.

1,329,947.

Patented Feb. 3, 1920.

Witnesses
H. Ackman Jr.

Inventor
Charles V. Bean

By Victor J. Evans
Attorney

UNITED STATES PATENT OFFICE.

CHARLES V. BEAN, OF CASEY, ILLINOIS.

INTERNAL-COMBUSTION ENGINE.

1,329,947.  Specification of Letters Patent.  Patented Feb. 3, 1920.

Application filed May 24, 1919. Serial No. 299,406.

*To all whom it may concern:*

Be it known that I, CHARLES V. BEAN, a citizen of the United States, residing at Casey, in the county of Clark and State of Illinois, have invented new and useful Improvements in Internal-Combustion Engines, of which the following is a specification.

This invention relates to internal combustion engines, the object in view being to provide a novel form of cylinder and piston whereby a more equal distribution of power is obtained on the piston avoiding what is known in the art as piston slam which is ordinarily produced by a greater explosive force upon one side of the head of the piston than upon the other side, causing the piston to tilt and then slam against the inside wall of the cylinder.

By means of the construction herein described and shown, the force of the impact against the piston is more evenly distributed around the peripheral portion or margin of the cylinder head, thereby overcoming the tendency of the piston to tilt and slam. A further object of the invention is to provide a longer bearing between the piston and the connecting rod when said parts are connected together and further to provide for water cooling the inside wall of the cylinder within the open center of the piston.

With the above and other objects in view, the invention consists in the novel construction, combination and arrangement of parts herein fully described, illustrated and claimed.

Figure 1:
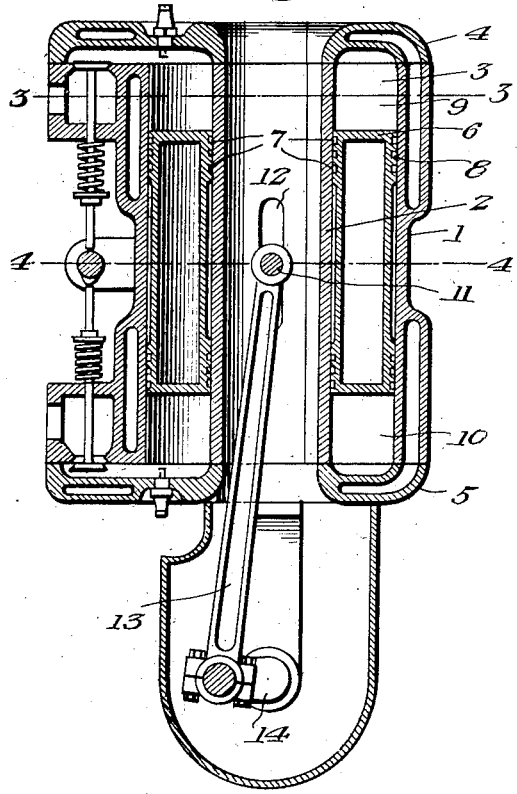
Figure 1 is a diametrical section through a cylinder and piston embodying the present invention.
Figure 2:
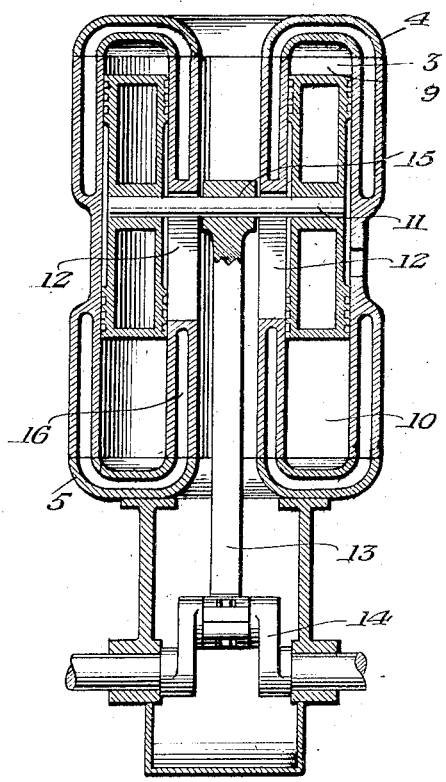
Fig. 2 is a similar view taken at a right angle to Fig. 1.

In carrying out the present invention, I employ a cylinder embodying an outer wall 1 and an inner wall 2, said walls being arranged in spaced concentric relation to each other as clearly shown in the drawing so as to provide an annular piston chamber 3, the same being closed by the heads 4 and 5 at the opposite ends thereof.

Mounted for reciprocatory movement in the cylinder above referred to is a ring shaped piston 6 or in other words a ring or open center annular formation, said ring being formed with annular recesses or grooves, in the inner and outer faces thereof to respectively receive packing rings 7 and 8 designed to travel in contact with the respective adjacent cylinder walls to prevent leakage and maintain the necessary compression in the combustion chambers 9 and 10 at opposite sides of the piston.

Extending diametrically through the piston 6 is a piston pin 11 and the inner wall 2 of the cylinder is formed with central longitudinal guideways or grooves 12 to admit of the reciprocatory movement of the pin 11 as the piston 6 moves in a corresponding direction. 13 designates the connecting rod which is attached at one end to the pin 11 and at its other end to the crank shaft 14 of the engine. By reason of the construction just described it will be seen that an unusually long bearing 15 may be provided between the connecting rod 13 and the piston pin 11. This together with the annular formation of the piston and the combustion chamber of the cylinder provides for an equal distribution of the explosive force against the piston.

Figure 3:
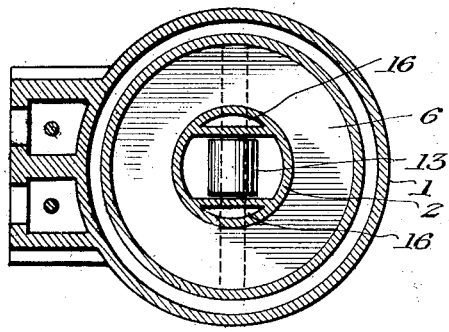
Fig. 3 is a horizontal section on the line 3—3 of Fig. 1.
Figure 4:
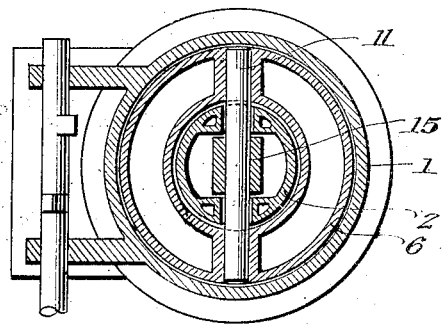
Fig. 4 is a horizontal section on the line 4—4 of Fig. 1.

The construction shown and described also provides for a sector-shaped water jacket 16 within the inner wall 2 of the cylinder as shown in Fig. 3. This enables the inner wall, as well as the outer wall of the cylinder to be water cooled, it being understood that a water jacket may be placed around the outer wall 1 of the cylinder in the usual internal combustion engine practice. Furthermore, the air may circulate freely back and forth through the center of the piston and, of course, back and forth within the inner tubular wall 2 of the cylinder. The engine is thus prevented from over-heating and is kept in a cool and efficient condition at all times.

Having thus described the invention, what is claimed as new, is:—

1. In an internal combustion engine, a cylinder having outer and inner walls in spaced relation to each other forming an annular piston chamber, heads at opposite ends of said cylinder forming in conjunction therewith combustion chambers at opposite sides of the piston, and a ring shaped open center piston working in said annular piston chamber and having a diametrical piston pin for the connecting rod, the cylinder having slots in which said pin works.

2. In an internal combustion engine, a cylinder having outer and inner walls in spaced relation to each other forming an annular piston chamber, heads at opposite ends of said cylinder forming in conjunction therewith combustion chambers at opposite sides of the piston, and a ring shaped open center piston working in said annular piston chamber and having a diametrical piston pin for the connecting rod, the cylinder having slots in which said pin works, the inner wall of the cylinder having internal sector shaped water jackets.

CHARLES V. BEAN.